United States Patent
Veltman et al.

(10) Patent No.: US 6,214,398 B1
(45) Date of Patent: Apr. 10, 2001

(54) METHOD AND APPARATUS FOR PITTING PEACHES

(75) Inventors: Joost Veltman, Aptos; Stanley Groom; Westley W. Walter, both of Madera, all of CA (US)

(73) Assignee: FMC Corporation, Chicago, IL (US)

( * ) Notice: Subject to any disclaimer, the term of this patent is extended or adjusted under 35 U.S.C. 154(b) by 0 days.

(21) Appl. No.: 09/310,039

(22) Filed: May 11, 1999

(51) Int. Cl.⁷ .................................................... D23N 4/08
(52) U.S. Cl. ............................ 426/485; 426/518; 99/553; 99/557
(58) Field of Search ............................ 99/551, 552, 553, 99/547; 426/485, 518, 231

(56) References Cited

U.S. PATENT DOCUMENTS

| | | | |
|---|---|---|---|
| 1,392,518 | * 10/1921 | Paranteau | 99/551 |
| 3,353,860 | * 11/1967 | Meissner | 99/551 |
| 4,213,382 | * 7/1980 | Meissner | 99/551 |

OTHER PUBLICATIONS

Emerson Motion Control, "E Series Digital Servo Drive" (1997).
FMC Corporation, "Automatic Cling Peach Torque Pitter" (1980).

* cited by examiner

Primary Examiner—Gabrielle Brouillette
Assistant Examiner—Hao Mai
(74) Attorney, Agent, or Firm—Flehr Hohbach Test Albritton & Herbert LLP

(57) ABSTRACT

A servo driven peach pitter mechanism with a servo motor (100) for a gripper mechanism head assembly (60) and a servo motor (118) for a selective knife (56), to achieve unlimited control flexibility in rotation of gripper mechanisms (62) and selective knife (56). Servo motor (100) controls rotation of a tubular housing (69) of the head assembly (60), which in turn rotates the gripper mechanism (62). Servo motor (118) includes a 90 degree gear box (114) which connects with a spindle (112) that carries the selective knife (56).

10 Claims, 6 Drawing Sheets

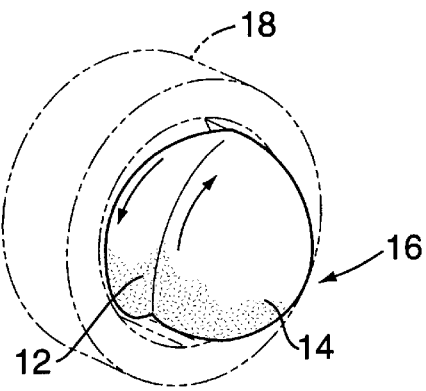 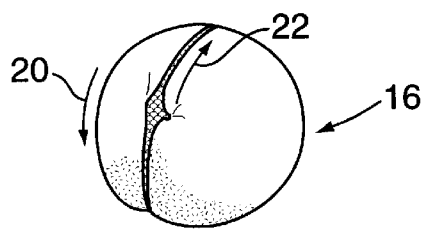
FIG. 1  FIG. 2A
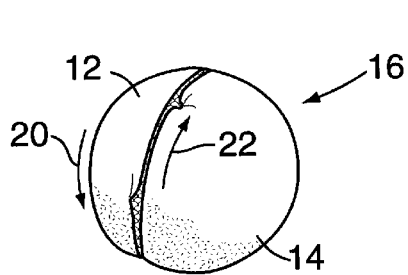 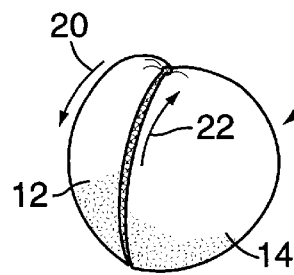 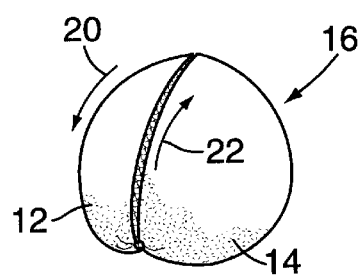
FIG. 2B  FIG. 2C  FIG. 2D
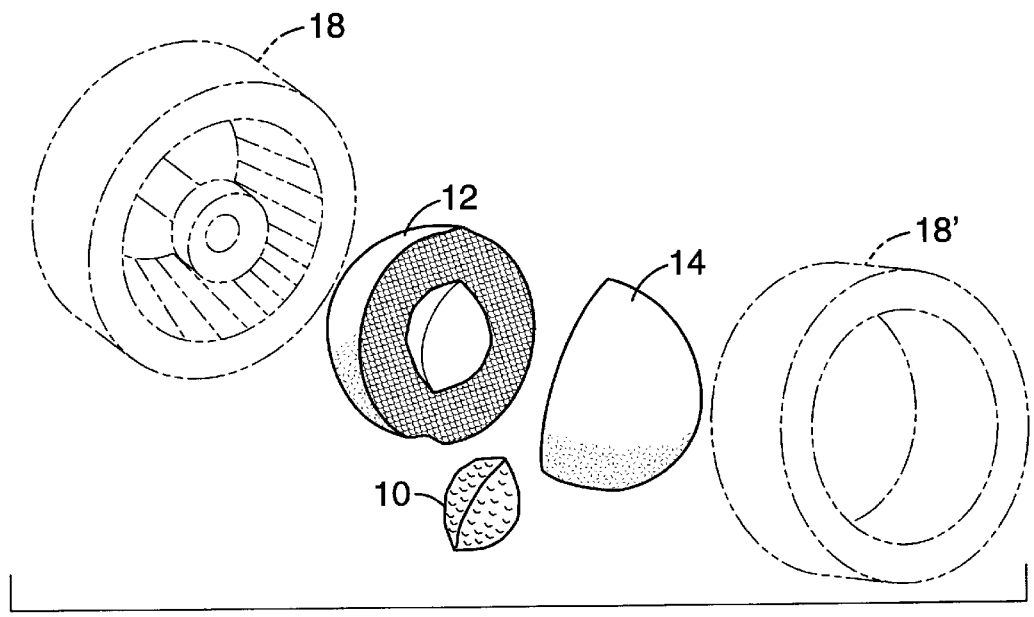
FIG. 3

FIG. 6
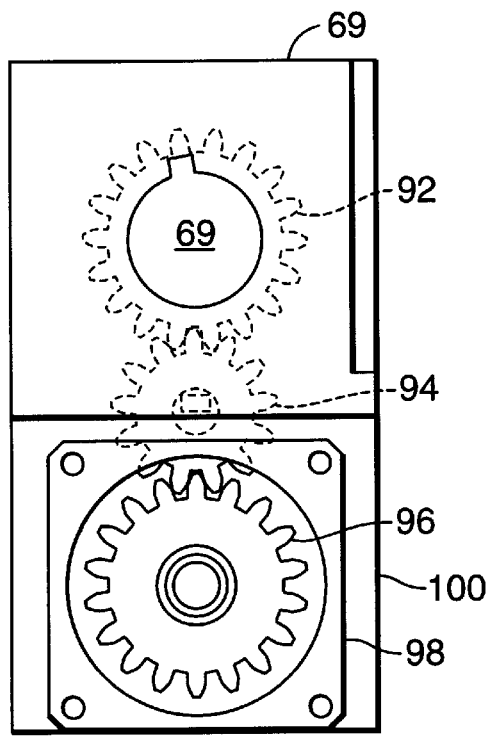
FIG. 10
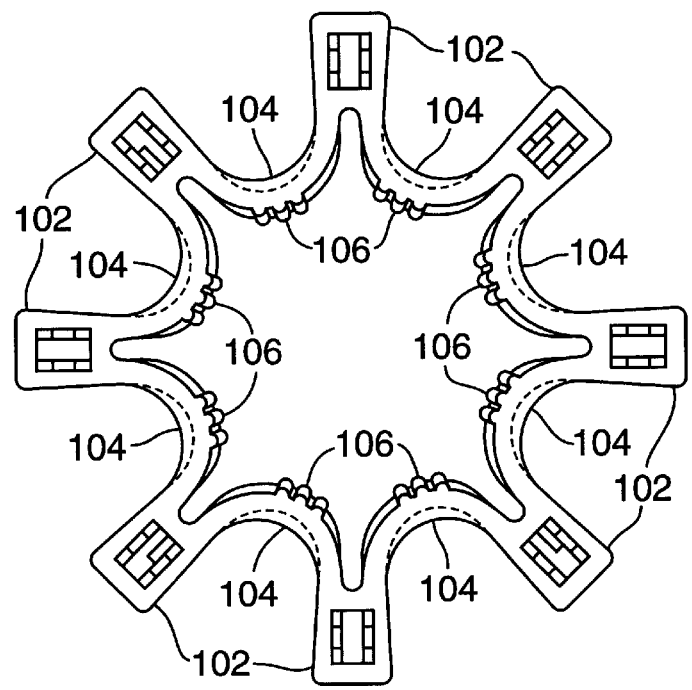
FIG. 7

METHOD AND APPARATUS FOR PITTING PEACHES

TECHNICAL FIELD

The present invention pertains to cling peach pitters and, more particularly, to the control and operation of the head assemblies and cutting blades that separate pits from the meat of cling peaches.

BACKGROUND OF THE INVENTION

Removing pits from peaches by automated machinery is performed by a peach pitting machine. In operation, this machine twists each peach half in opposite directions in an automatic peach pit twist operation. Whole peaches are first singulated by an infeed system when entering these machines. Singulated peaches are than processed through a peach aligner and transferred, one at a time, from the aligner into a set of rotatable heads, each with a peach gripper mechanism. A set of blades cut the peach in halves until the blades penetrate the peach far enough to grab the pit. The cutting blades are positioned perpendicular to the rotating axis of the peach twisting pitting heads. The heads then rotate in opposite directions, as the pit is constrained in a stationary position by the cutting blades. The rotating, or twisting motion of the two pitter heads, with the peach halves grabbed by the gripper mechanism of the heads, rips the meat of the peach from the pit, resulting in separation of the pit from each peach half.

The peach pitter heads each are typically a set of mechanically linked components, such as cam path mechanisms and/or lever arms, that are set up to rotate the gripper mechanisms through a set degree of rotation. Because the mechanical motion transmission components have a fixed profile, the peach head twister motion is always the same, typically in the range of 150 degrees. Unfortunately, mechanical components can not be readily adjusted to change the degree of head rotation. If a change in head rotation was desired, this would require a permanent change of components to create an alternate fixed set up.

For removal of the pit, as a matter of peach physics, the peach halves do not always have to rotate 150 degrees. With a solid pit, for example, the pit can sometimes be removed from the peach half by rotating the heads as little as 60 degrees. For these peaches, the motion required for the rotating pitter heads can be considerably reduced to remove a peach pit. A reduced rotating motion requires less time and allows for an increase in machine through put.

Peach quality, ripeness, firmness, etc., may require a slightly different head rotation to insure removal of the pit. Therefore peach pitter machines are always set up for the maximum head rotation. This has resulted in standard mechanical head drive components, which are typically set up for 150 degrees rotation.

Also, the peach pitter blades are provided with a selective knife. The selective knife, imbedded in the cutting blades, will only become functional when the pit can not be removed by rotating the heads. This will be the case when pits are weak or split inside the peach. Peach halves rotated in each head with a split pit can not develop a twisting force between pit and the peach half. As a result, the pit half will remain inside each peach half. To remove these half pits, the selective knife will become active and cut the pit from the peach half during rotation of the pitter head. Depending on the shape of the selective knife, the head must now be rotated exactly 150 degrees to insure the pit is removed from the peach half.

In short, the peach pitter heads can be rotated less than 150 degrees when removing the pit from the peach half by twisting the whole pit from the peach halves. But the heads must rotate 150 degrees when the selective knife cut is employed to remove the pit from each peach half.

SUMMARY OF THE INVENTION

Briefly described, the method of the present invention for separating the meat from the pit of the peach comprises the steps of cutting substantially through an equator of the peach with a pair of cutting blades until the blades engage the pit and the pit is held by the blades, grabbing each half of the peach formed by the cutting blades with a gripper mechanism, and depending on the condition of the peach, selectively rotating the gripper mechanisms in opposite directions through a degree of rotation within the range from approximately 60 degrees to approximately 360 degrees.

According to an aspect of the invention, the step of selectively rotating the gripper mechanism includes coupling a servo motor to the gripper mechanism and selectively controlling rotation of the servo motor. Provision of a servo motor allows selective rotation of the gripper mechanisms in any direction and through any desired degree of rotation, which may be highly desirable depending on the condition of the peach. For example, a particularly ripe peach may only require 60 degrees of rotation while an unripe, green peach may require 180 degrees of rotation. In addition, it may in some circumstances be desirable to rotate the peach halves up to 360 degrees.

According to another aspect of the invention, the step of selectively rotating the gripper mechanism includes coupling a linear actuator to the gripper mechanism, for movement of the gripper mechanism toward and away from the peach, and rotating the linear actuator with the servo motor. In this manner, the gripper mechanisms can move toward and away from the peach, yet still be rotated by the servo motors. Preferably, the linear actuator includes a piston rod and the method includes the step of rotating the piston rod with the servo motor.

The method of the invention further comprises the step of processing peaches with broken, cracked or weak pits. Should the cutting blades penetrate the pit and sever the pit into pit halves, as typically happens with the aforementioned pits, a rotatable cutting knife scoops each pit half from the meat of each peach half by selectively rotating through a degree of rotation within a range from approximately 10 degrees to approximately 180 degrees.

According to this additional step of the invention, after selectively rotating the cutting knife, the method includes the step of selectively rotating at least one of the gripper mechanisms through a degree of rotation within the range from approximately 10 degrees to approximately 360 degrees and then selectively rotating the cutting knife again through a degree of rotation within a range from approximately 10 degrees to approximately 180 degrees. The combination of a selectively rotatable cutting knife and selectively rotatable gripper mechanisms provides for near total flexibility in techniques for separating the meat from the pit.

The present invention also includes an apparatus for separating the pit from the meat of a peach. The apparatus comprises a pair of cutting blades for cutting substantially through an equator of the peach until the blades engage the pit and the pit is held by the blades, a pair of head assemblies moveable toward and away from the peach for grabbing each half of the peach formed by the cutting blades, and a pair of servo motors for rotating the head assemblies selectively in opposite directions through a range of degrees of rotation from approximately 60 degrees to approximately 360 degrees.

According to an aspect of the apparatus of the present invention, a cutting knife is carried by one of the cutting blades, the cutting knife being rotatable through a range of degrees of rotation, and the apparatus further includes a servo motor coupled to the cutting knife for selective rotation of the cutting knife through a degree of rotation within the range of 10 to 180 degrees.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

In the drawings, like reference numerals refer to like parts throughout the several views, wherein FIG. 1 is a pictorial view of a peach and one gripper mechanism positioned about the far half of the peach for rotating that half of the peach;

FIG. 2A is pictorial view of the peach of FIG. 1 showing the opposite directions of rotation for each half of the peach;

FIG. 2B is pictorial view of the peach of FIGS. 1 and 2A showing the peach halves rotated in opposite directions;

FIG. 2C is a pictorial view of the peach of FIGS. 1–2B showing the peach halves rotated approximately 90 degrees;

FIG. 2D is a pictorial view of the peach of FIGS. 1–2C showing the peach halves rotated approximately 180 degrees;

FIG. 3 is a pictorial view of the peach halves of FIGS. 2A–2D separated and the peach pit separated from the peach halves, and also showing the gripper mechanisms moved apart from their peach rotating positions;

FIG. 6 is an end elevation view of the gear assembly between the servo motor and rotatable head assembly actuator;

FIG. 7 is a front view of a gripper mechanism;

FIG. 10 is a schematic top view of the cutting blade of FIG. 8 showing 0 degrees, 60 degrees, 90 degrees, and 120 degrees rotated positions.

DETAILED DESCRIPTION OF THE INVENTION

Figure 4:
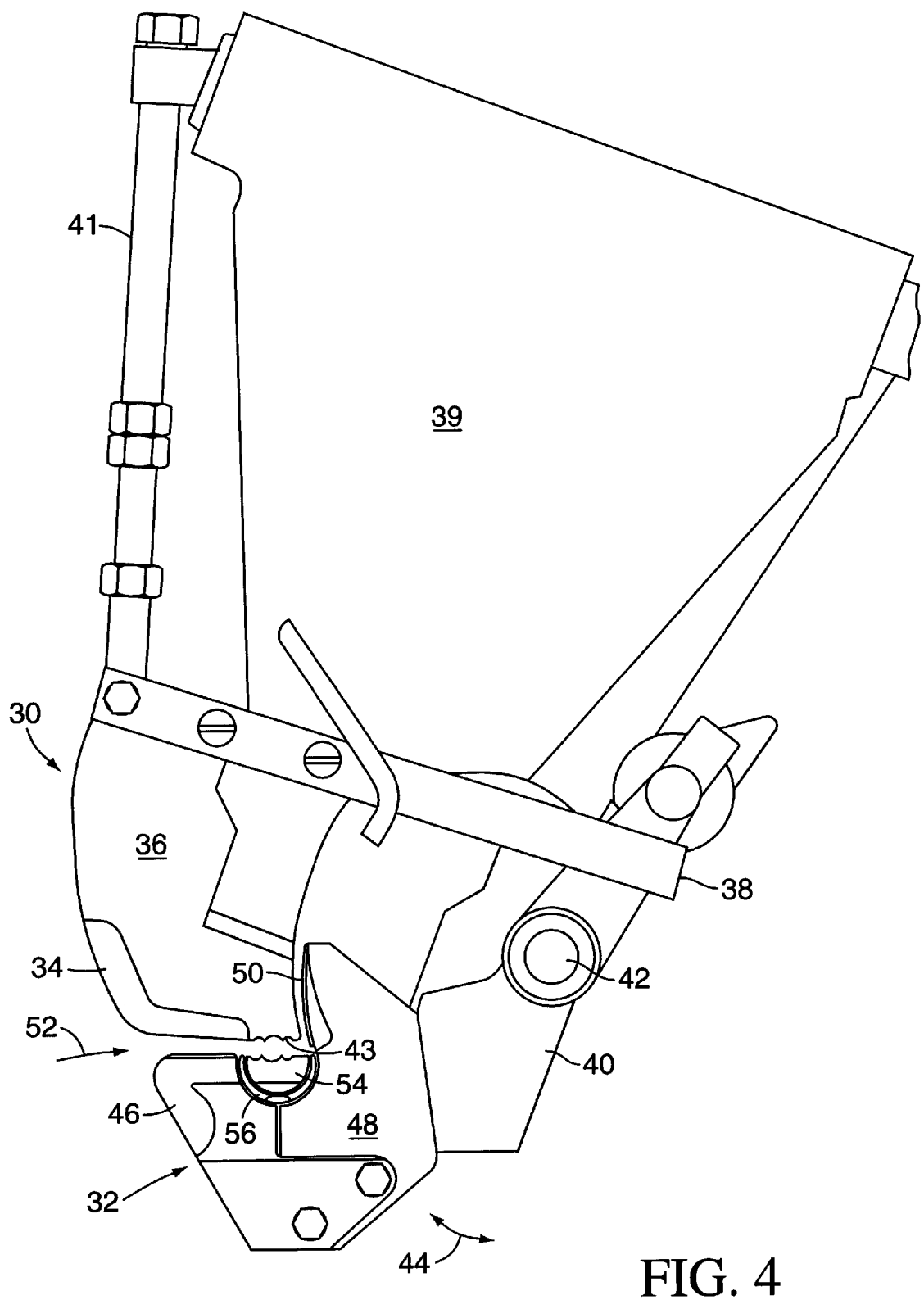
FIG. 4 is a side elevation view of the upper and lower blades and their arm support assemblies.

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

To accomplish a great variety of head rotational variables is extremely difficult to do with mechanically driven heads such as those discussed herein in the background section. The present invention proposes to accomplish head rotation with alternate means, completely independent from the mechanical drive of the peach pitter mechanism.

FIGS. 1–3 show generally the process for removing a peach pit 10 from the halves 12, 14 (also referred to as the meat of the peach) of a peach that is generally indicated by reference numeral 16. FIG. 1 shows an inflatable gripper diaphragm ring 18 that is positioned about one half 12 of peach 16. A similar gripper diaphragm ring 18' is used for peach half 14. Each gripper diaphragm ring 18, 18' mounts over its respective peach half and inflates to grip the skin of the peach half for twisting.

Prior to positioning the gripper diaphragm rings over the peach halves, the peach is positioned between upper and lower slicing blades that cut around the natural equator of the peach down to the depth of the pit. These components are discussed in more detail later.

With prior art peach pitters, each gripper mechanism, regardless of its design, rotates through a predetermined angle fixed by the mechanical structure of the system and in a direction opposite to the direction of the other gripper mechanism. FIG. 2A shows the opposite directions, indicated by arrows 20, 22, that each gripper diaphragm ring 18, 18' is rotated. FIG. 2B shows rotation of each peach half 12, 14 approximately 30 degrees. FIG. 2C shows the peach halves 12, 14 rotated approximately 90 degrees, and FIG. 2D shows the peach halves 12, 14 rotated approximately 150 degrees.

As shown in FIG. 3, after 150 degrees of rotation of the gripper mechanisms, the gripper mechanisms are separated, allowing the peach halves 12, 14 and the peach pit 10 to fall separately into a receptacle positioned below. As discussed previously, 150 degrees of rotation is accomplished via mechanical actuators that have fixed travel lengths that can't be varied. The method and apparatus of the present invention proposes to drive the heads of the gripper mechanisms with servo motors, electronically matched to the peach pitter main drive mechanism.

Referring to FIG. 4, shown are an upper cutting blade assembly 30 and a lower cutting blade assembly 32. Upper cutting blade assembly 30 is fixed in position by a support arm 38 that is adjustably mounted to frame 39 by an adjustable rod 41. Upper blade assembly 30 includes an L-shaped forward edge cutting surface 34 that forms part an upper blade piece 36, which in turn is mounted to support arm 38. Once adjusted, upper blade 36 is fixed in position and does not move during operation of the peach pitter. Blade piece 36 further includes a somewhat serrated rear edge 43 that is designed to engage the pit of each peach.

Lower cutting blade assembly 32 is movable on a pivotable support arm 40 that pivots at 42 in the direction of arrow 44. Lower cutting blade assembly 32 includes a V-shaped, forward cutting surface 46 that forms part of lower blade piece 48 and a rear, vertical cutting surface 50. During operation, a peach is transferred toward cutting surfaces 34, 46, in the direction of arrow 52, when the lower blade piece 48 is in its retracted position, in a manner where the pit of the peach moves between the gap formed by cutting surfaces 34, 46. As the pit moves between cutting surfaces 34, 46, the meat of the peach along the top and bottom of the peach is sliced by the cutting surfaces.

In addition, the peach is advanced until the pit of the peach reaches vertical cutting surface 50. In this position, cutting surface 50 slices upward rotating around pivot 42 into the forward portion of the peach.

Lower blade assembly 32 also includes a semi-circular serrated blade portion 54 that is mounted to blade piece 48. Discussed in more detail with reference to FIG. 8, lower blade assembly 32 further includes a C-shaped selective cutting knife 56 that is positioned between serrated blade 54 and blade 48 and is mounted on a spindle (not shown) for rotation when necessary to cut the pit from the meat of the peach. This process is also discussed in more detail later.

Figure 5:
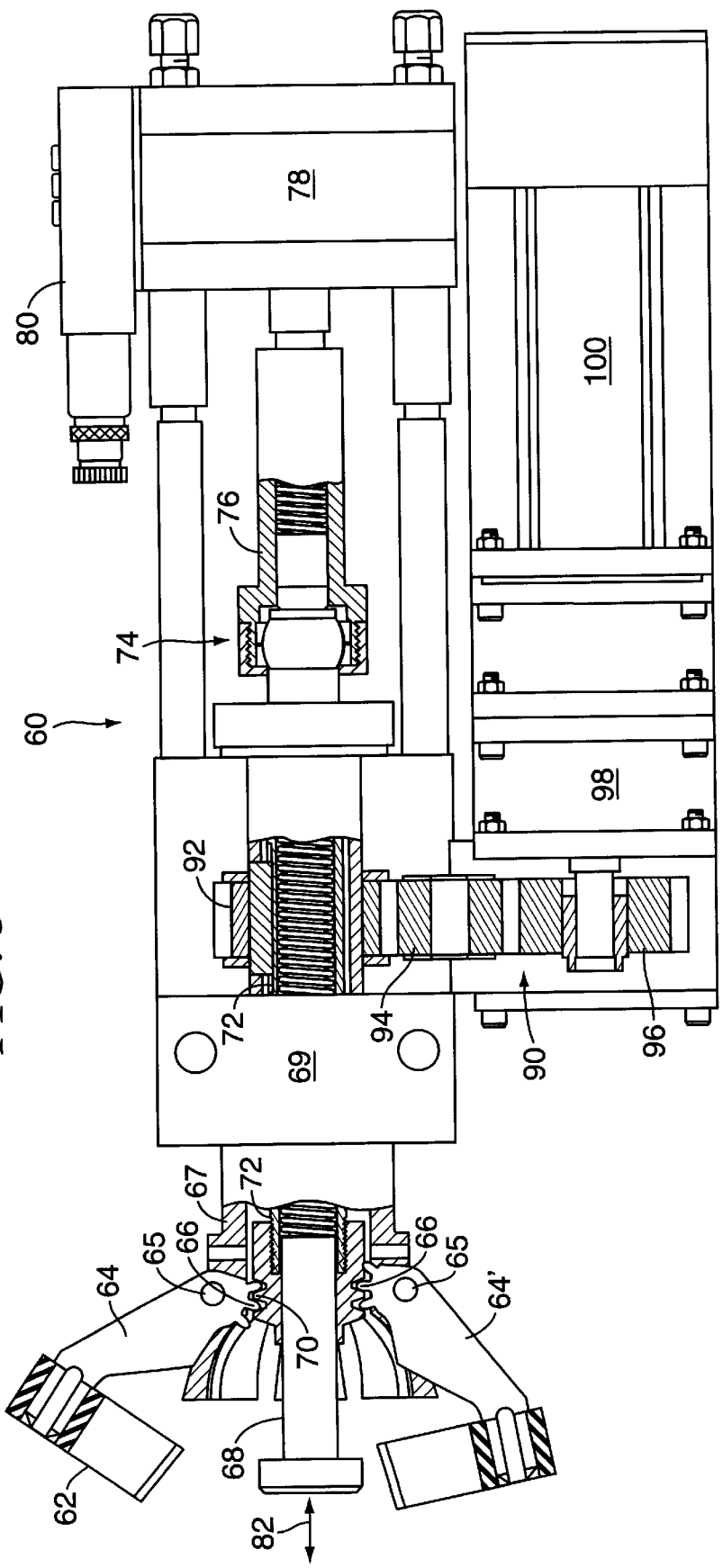
FIG. 5 is a sectional view of one of the head assemblies that carries the gripper mechanism of FIG. 1.

FIG. 5 shows a head assembly 60 that carries a gripper mechanism 62 that us functionally similar to the gripper mechanism shown in phantom in FIGS. 1 and 3. Gripper mechanism 62 is shown in more detail in FIG. 7. Gripper mechanism 62 is flexibly carried on eight pivotal fingers 64 (only two shown). Finger 64 is shown in an open position and finger 64' is shown in a closed position. Fingers 64, 64' open and close together, but are shown in different positions for illustration purposes only. Fingers 64, 64' pivot at 65 and on their inner ends each include a pinion gear 66. Fingers 64 are carried on a tubular housing member 67 that is rotatably mounted in the housing 69 of head assembly 60.

Head assembly 60 also includes a plunger 68 for holding the side of a peach. Plunger 68 has mounted at its inner end a rack 70 that drives pinion gears 66. Rack 70 is threaded onto a drive tube 72 that rotatably mounts at its inner end to a ball and socket assembly 74. Ball and socket assembly 74 includes a tubular rod 76 that connects to the piston rod of an air cylinder 78. A closed coupled pneumatic valve assembly 80 and associated controls control operation of air cylinder 78. Linear movement of the piston rod of air cylinder 78 moves drive tube 72 linearly independent of tubular housing 67, which thereby moves gripper mechanism 62 in and out, in the direction of arrow 82, and opens and closes fingers 64.

Referring to FIG. 6, a satellite gear assembly 90 is provided for rotation of tubular housing member 67 and drive tube 72. Satellite gear assembly 90 includes a drive gear 92, an intermediate gear 94, and a motor gear 96. Drive gear 92 is mounted to tubular housing 67 to cause rotation thereof, and is keyed to drive tube 72 as well, also to cause rotation of the drive tube with housing 67.

Motor gear 96 is part of a servo motor reducer 98 and servo motor 100 that rotates tubular housing member 67 and drive tube 72 and, in turn, rotates gripper mechanism 62 (FIG. 5). Servo motor 100 may be of the type manufactured by Emerson Motion Control of Chanhassen, Minn., USA and sold under the model designation E Series Digital Servo Drive. Servo Motor 100 rotates motor gear 96, which causes rotation of drive gear 92, thereby rotating tubular housing 67 and drive tube 72. This causes gripper mechanism 62 and plunger 68 to rotate together.

Ball and socket assembly 74 allows for rotational movement of drive tube 72 independent of rod 76 and the piston rod of air cylinder 78.

FIG. 7 shows a preferred design for gripper mechanism 62. The gripper mechanism is ring-shaped and includes eight finger mount heads 102 with openings for mounting onto the fingers of a head assembly. Between each finger mount head 102 extends a web section 104 that includes on its inner side a series of ribs 106 to enhance gripping of a peach. Webs 104 allow gripper mechanism 62 to expand when the fingers open, for positioning around the peach.

Figure 8:
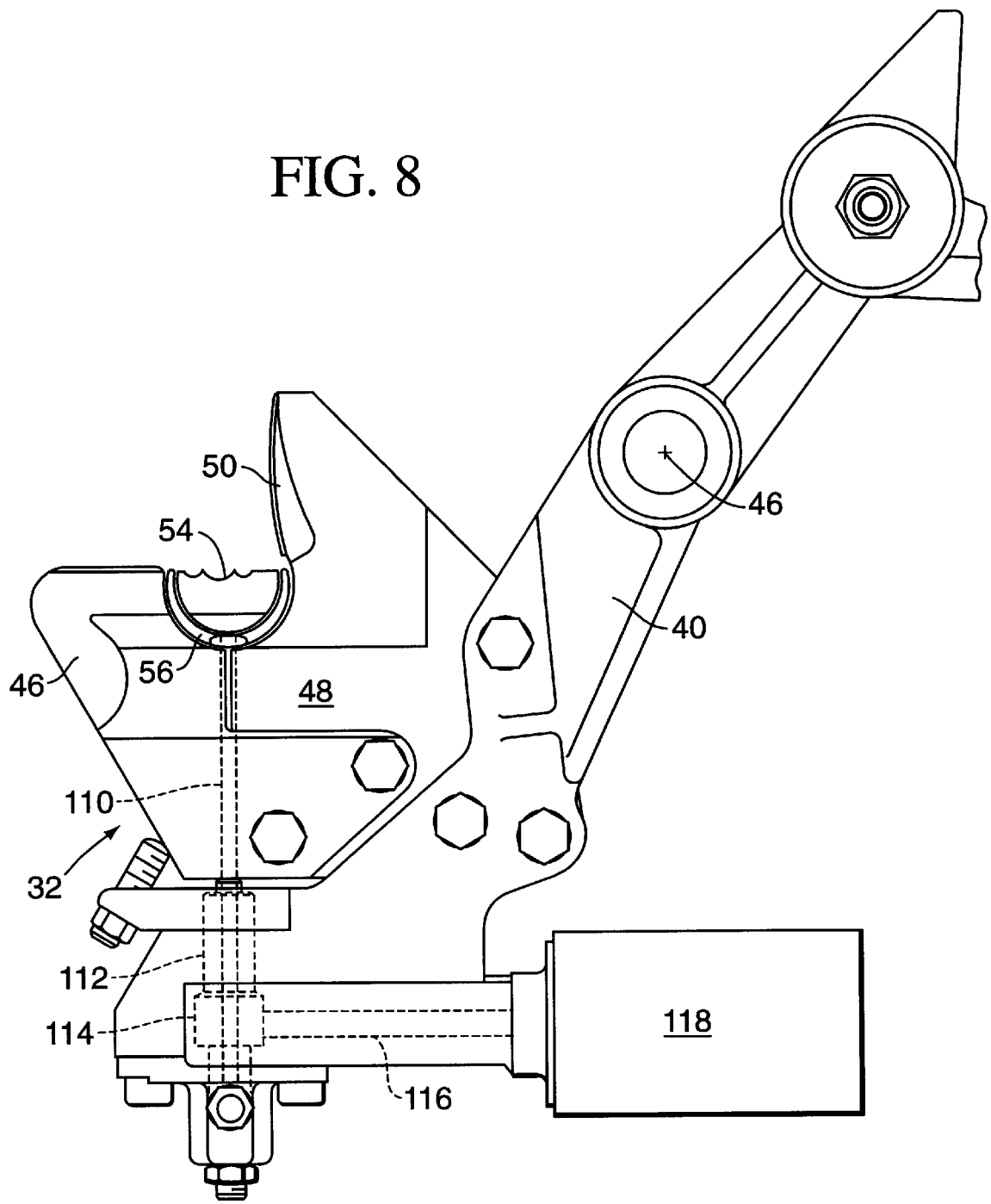
FIG. 8 is a side elevation view of the selective cutting knife used to separate an imperfect peach pit from the meat of the peach.

Referring to FIG. 8, the C-shaped selective cutting knife 56 of lower blade assembly 32 is mounted for rotation on a spindle 110 that is rotatably mounted in bearing support 112. A 90 degree gear assembly 114 connects with spindle 110 and the drive axle 116 of a servo motor assembly 118. To increase selective knife rotational flexibility, yet retain synchronization with the peach head mechanism for cutting split pits from peach halves, servo drive mechanism 118 is provided, which enables the program to determine the type and the timing of the selective cut motion.

Servo drive mechanism 118 is similar in design to that of the servo motor of the head assembly and is available from Emerson Motion Control. Servo motor 118 provides for controlled rotation of selective cutting knife 56 in any manner desired, as discussed herein.

Figure 9A:
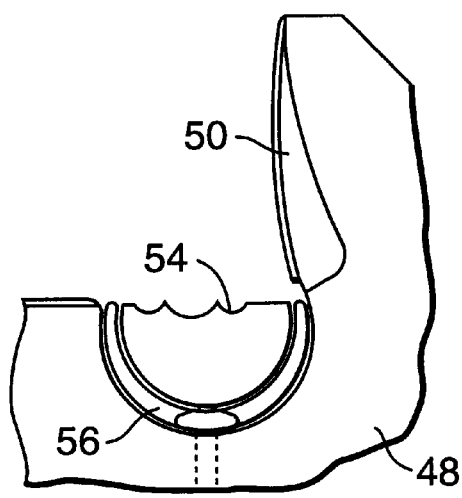
FIGS. 9A–9D are enlarged side views of the cutting blade of FIG. 8 shown in phantom in 0 degree, 60 degree, 90 degree, and 120 degree rotated positions.
Figure 9B:
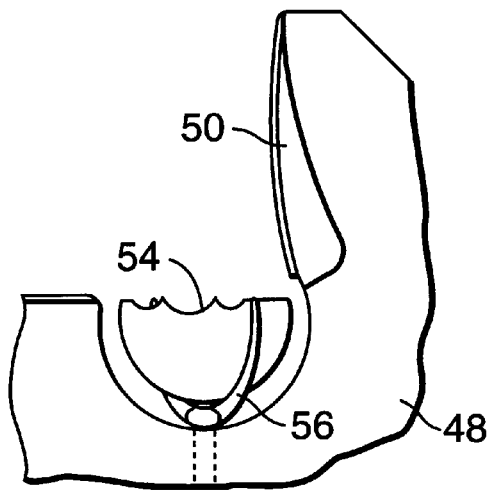
Figure 9C:
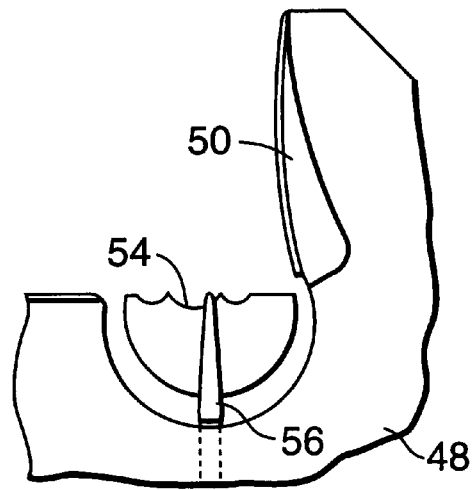
Figure 9D:
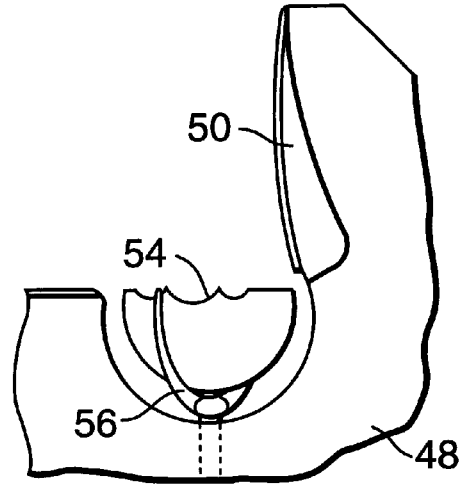

Referring to FIGS. 9A–9D, rotation of cutting knife 56 is shown from a 0 degree position of alignment with serrated blade 54 (FIG. 9A), to a position of 60 degrees of rotation (FIG. 9B), to a position of 90 degrees of rotation (FIG. 9C) to a position of 120 degrees of rotation (FIG. 9D). These positions are shown in plan view in FIG. 10.

Selective cutting knife 56 is used when the serrated blades 43, 54 cut through the peach pit rather than grip the pit. This typically happens when the pit is weak, cracked or otherwise improperly formed. If the serrated blades cut through the peach pit, rotation of the peach halves is pointless because the peach halves will rotate with the meat. Cutting knife 56 is rotated to cut at the surface of the peach pit in order to separate the meat from the pit.

Provision of servo motors and associated controls allows the peach pitter to be programmed for an unlimited number of degrees of rotation of the gripper mechanisms and cutting knife. Thus, the machine can be instantly switched between the standard twist pitting method of possibly 60 degrees of rotation for normal ripened fruit, to a special condition more suitable for soft fruit, or green fruit, where up to 360 degrees of rotation may be required. Specific control of rotation will enable the operator to optimize production throughput based on fruit condition, and improve peach half quality for otherwise difficult to process fruit.

In addition, the servo driven selective cutting knife allows for selective rotational control of the knife alone or in combination with selective rotational control of the gripper mechanisms when, for example, a selective pitting detector observes a split pit, requiring an alternate rotational mode.

The peach pitter head assembly drive program can be quickly altered to adjust to changes in peach quality and uniformity, and can be accomplished without major component modifications. Increased flexibility provided by servo driven heads, to adjust to the variations of the fruit conditions, allows for advancement in machine product through put and yield, as well as improvements in product quality.

obviously the method of driving the peach heads independently can be accomplished with similar electro mechanical mechanisms, such as a less complex stepping motor, or even a vector drive. For this execution a servo motor method was selected to provide a high torque in a very compact drive package. And, the servo mechanism provides a means of rotational feedback required for a smart flexible multiple pitting configuration program. For simpler applications a servo drive mechanism will be adequate.

The selective cutting knife is a second but independent feature from the peach pitter rotating heads. With earlier designs, the selective knife was coupled mechanically to the main drive mechanism. This mechanical driven selective knife mechanism introduces the same limitations as previously described for the mechanical driven pitter heads. Typically, the selective knife was driven by a fluid energized mechanism such as a pneumatic cylinder. This type of mechanism only offers a one position rotational stroke for the knife.

Accomplishing a variety of selective knife rotational motions is extremely difficult to do with mechanically driven knives. The servo driven selective knife accomplishes rotation with a completely independent drive that is electronically coupled to the peach pitter head mechanism. This approach allows the machine to be programmed for varying conditions, such as ripeness of a peach. The machine can be instantly switched between the standard selective cut to a alternate cut method with reduced knife rotation for easily removed pit halves. This will enable the operator to optimize production throughput based on fruit condition.

The same servo knife drive method can be programmed to alter the rotational requirement of the knife when the selective pitting detector observes high frequencies of split peach pit reoccurring and the cutting effect is marginal. Alternate selective knife motion programming for removing split pits offers the operator a tool to adjust the machine to varying fruit conditions. The greater flexibility will allow the operator to optimize peach pitter through put and/or product quality.

Obviously the method of driving the selective knife independent can be accomplished with similar electro mechanical mechanisms. Such as a less complex stepping motor, or even a vector drive. For this execution a servo motor was selected to provide a high torque in a very compact drive package. And, the servo mechanism provides a means of rotational feedback required for a smart flexible multiple pitting configuration program.

For simpler applications a servo drive mechanism will be adequate. Other schemes, for removing split pits from peach halves, can be envisioned by making a combination of selective knife cutting and head rotation, resulting in alternate head rotational requirements. For instance, the selective knife can be rotated to a 90 degree interference position with the peach head rotating. Thus cutting a 90 degree quadrant between peach half and pit. Subsequently the heads rotates the peach half by an additional amount to free the pit from the half. Say the heads rotates an additional 160 degrees to free the pit. Or an additional 200 degrees to assure the pit has been fully cut. With the existing fixed rotation pitter head design, all these possible methods for pit or half pit removal can not be exploited.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto when read and interpreted according to accepted legal principles such as the doctrine of equivalents and reversal of parts.

What is claimed is:

1. A method of separating the meat of a peach from the pit of the peach, comprising the steps of:

cutting substantially through an equator of the peach with a pair of cutting blades until the blades engage the pit and the pit is held by the blades, grabbing each half of the peach formed by the cutting blades with a gripper mechanism having an adjustable degree of gripper rotation within a range of rotations, selecting the degree of gripper rotation within the range of rotations, and thereafter rotating the gripper mechanisms in opposite directions through the selected degree of gripper rotation.

2. The method of claim 1 wherein, the step of grabbing is accomplished by using gripper mechanisms coupled for driving to servo motors having associated controls for selective adjustment of the degree of rotation of each gripper mechanism within a range of rotation between approximately 60 degrees and approximately 180 degrees.

3. The method of claim 2 wherein, the step of rotating the gripper mechanisms includes coupling a linear actuator to each gripper mechanism, for movement of the gripper mechanism toward and away from the peach, and rotating the linear actuator using the servo motor.

4. The method of claim 1, and further comprising the step of:

should the cutting blades penetrate the pit and sever the pit into pit halves, scooping each pit half from the meat of each peach half by rotating a cutting knife having an adjustable degree of knife rotation through a knife rotation selected to be within a range from approximately 10 degrees to approximately 180 degrees.

5. The method of claim 4 and further comprising the step of:

after selectively rotating the cutting knife, selectively rotating at least one of the gripper mechanisms through a degree of rotation within the range from approximately 10 degrees to approximately 360 degrees and then selectively rotating the cutting knife again through a degree of rotation within a range from approximately 10 degrees to approximately 180 degrees.

6. The method of claim 5 and further comprising the step of selectively rotating both gripper mechanisms through a degree of rotation within the range from approximately 10 degrees to approximately 360 degrees after selectively rotating the cutting knife.

7. The method of claim 1, and further comprising the steps of:

processing a plurality of peaches each using the steps of claim 1, and during said processing step, adjusting the degree of rotation in response to variation of the ripeness of the peaches.

8. The method of claim 1 wherein, the step of grabbing is accomplished using gripper mechanisms driven by a servo motor and drive assembly controlled by programmable controls.

9. The method of claim 4 wherein, the scooping step is accomplished by rotating the cutting knife through a degree of knife rotation selected in response to sensing by a pitting detector.

10. A method of separating the meat of a peach from the pit of the peach, comprising the steps of:

cutting substantially through an equator of the peach with a pair of cutting blades until the blades engage the pit and the pit is held by the blades, should the cutting blades penetrate the pit and sever the pit into pit halves, scooping each pit half from the meat of each pit half with a cutting knife having an adjustable degree of knife rotation within a range of rotations, selecting a degree of knife rotation within the range of rotations, and thereafter rotating the cutting knife through the selected degree of knife rotation.

* * * * *